United States Patent [19]
Asano et al.

[11] 3,755,909
[45] Sept. 4, 1973

[54] WIDE RANGE DIMENSION MEASURING APPARATUS

[75] Inventors: Hiroaki Asano, Kariya-shi; Ikuo Ohtsu, Toyota-shi, both of Japan

[73] Assignee: Toyoda Koki Kabushiki Kaisha, Kariya-shi, Japan

[22] Filed: June 21, 1971

[21] Appl. No.: 154,922

[30] Foreign Application Priority Data
July 1, 1970 Japan.............................. 45/57968

[52] U.S. Cl. ............................. 33/143 L, 33/147 N
[51] Int. Cl. ............................................ G01b 5/08
[58] Field of Search...................... 33/143, 147, 169, 33/170, 178

[56] References Cited
UNITED STATES PATENTS
3,688,411 9/1972 Asano ............................... 33/143 L
3,414,978 10/1968 Prow .................................. 33/178 R FOREIGN PATENTS OR APPLICATIONS
425,247 5/1967 Switzerland..................... 33/169 A

*Primary Examiner*—Harry N. Haroian
*Attorney*—E. F. Wenderoth, Jeffrey Nolton et al.

[57] ABSTRACT

Wide range dimension measuring apparatus comprising a measuring head movable toward and away from an object to be measured. A movable block is mounted on the measuring head to be movable relative thereto, a first measuring member is secured to one side of the movable block, a slidable member slidably received in the movable block, and a second measuring member is secured to the slidable member on the same side as the first measuring member so as to embrace the object between the first and second measuring members. A displacement detector is positioned to measure the relative displacement between the slidable member and the movable block for producing an electric signal. A first balancing weight means is provided for supporting the force of gravity or weight acting on the movable block, and a second balancing weight means is provided for supporting the force of gravity or weight acting on the slidable member.

19 Claims, 7 Drawing Figures

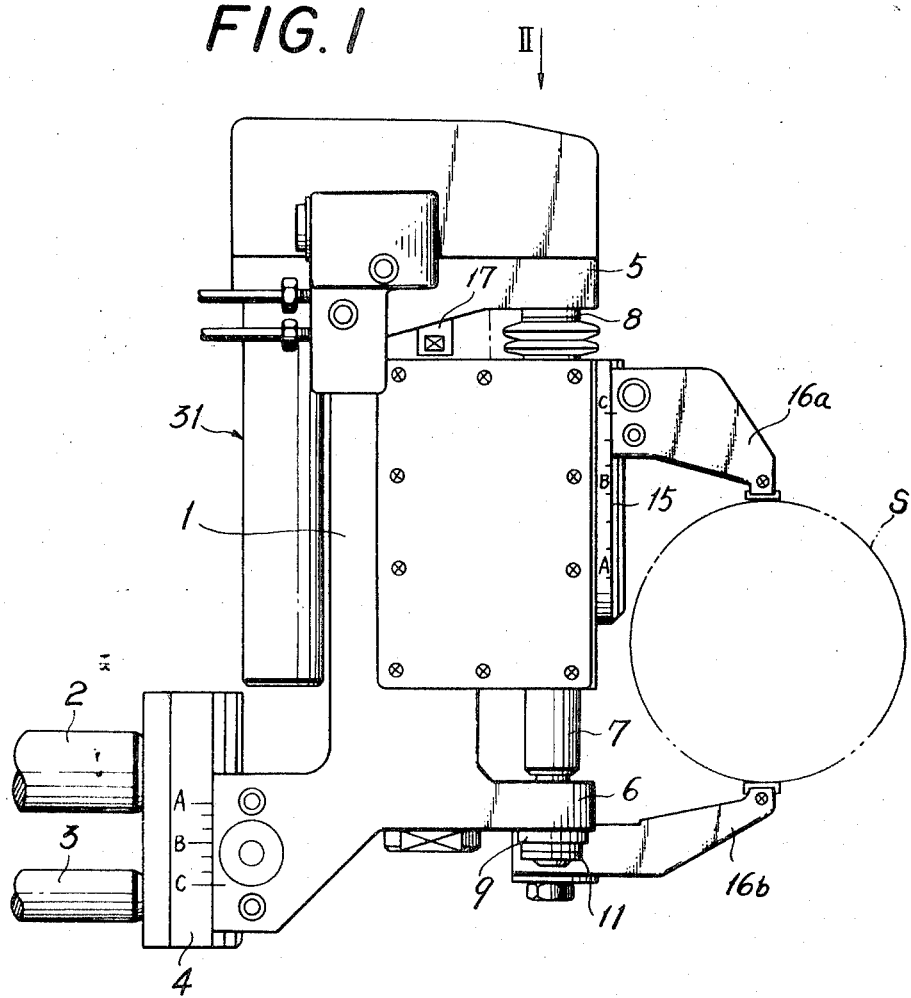

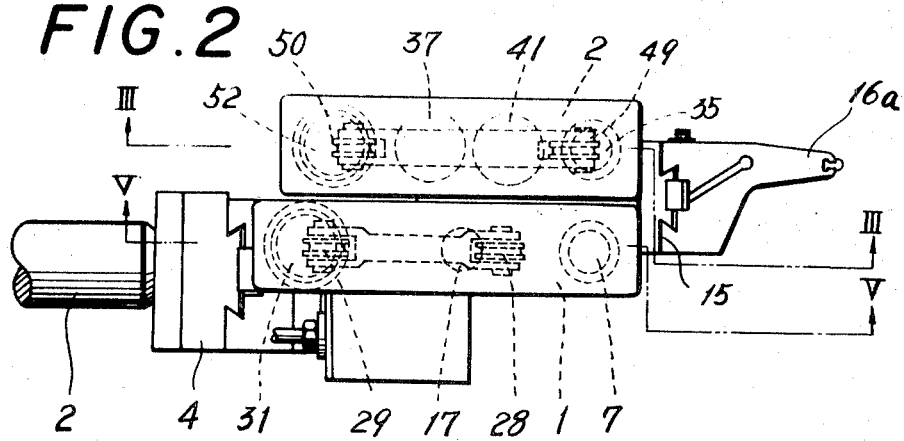
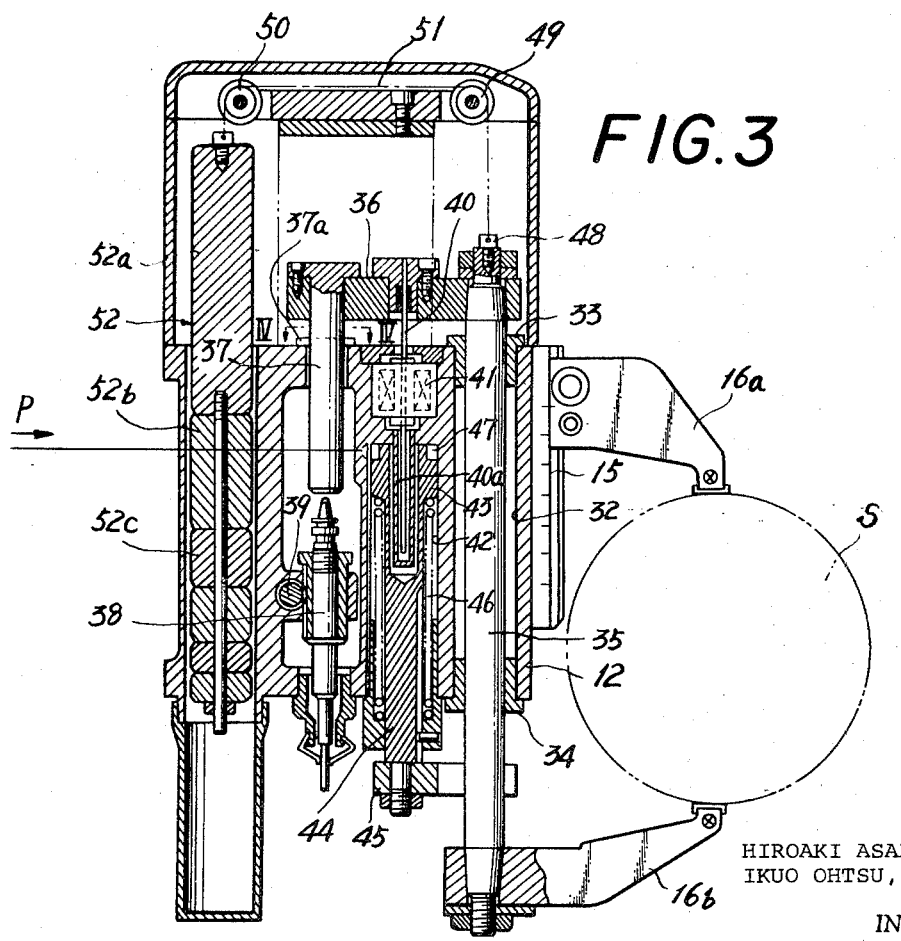

Patented Sept. 4, 1973

HIROAKI ASANO and
IKUO OHTSU,
INVENTORS

BY Wenderoth, Lind & Ponack

ATTORNEYS

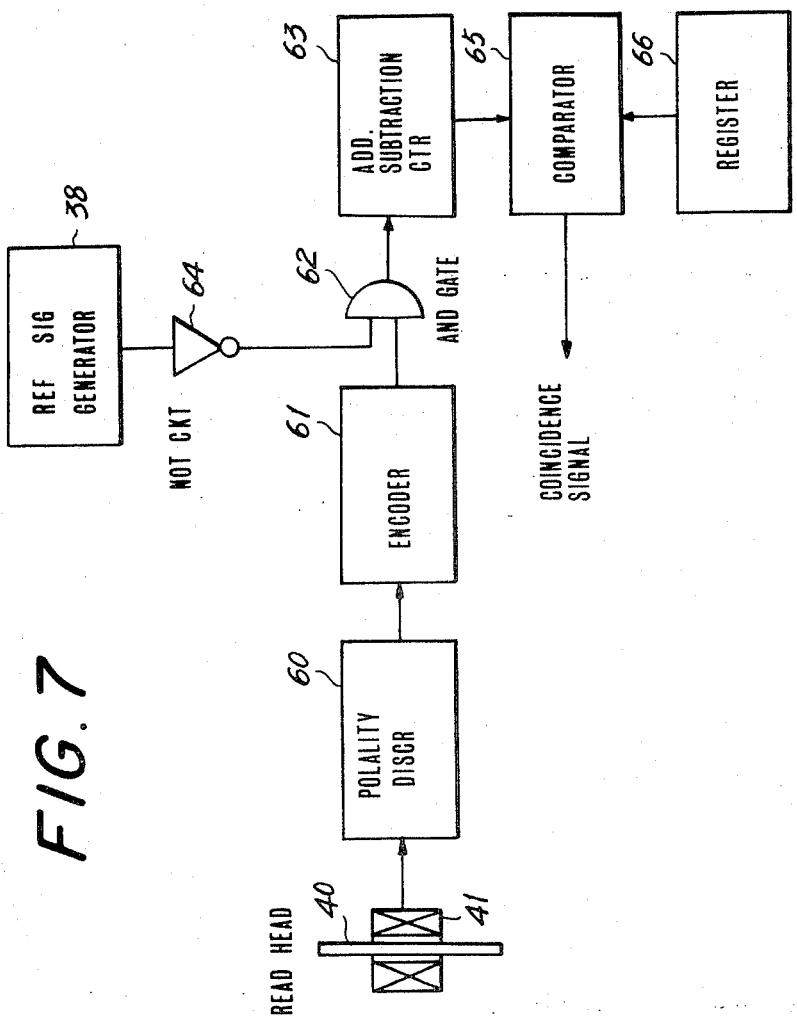

WIDE RANGE DIMENSION MEASURING APPARATUS

BACKGROUND OF THE INVENTION

This invention relates to a wide range dimension measuring apparatus and more particularly to a wide range dimension measuring apparatus capable of measuring at high accuracies the dimensions of workpieces of varying size.

The conventional wide range dimension measuring apparatus generally includes a pair of measuring members which are urged against a workpiece to be measured under a predetermined contact pressure by means of spring means. However, since the spring means is compressed by a predetermined amount, which is confirmed by a limit switch, the slight variation in the actuation of the limit switch causes the variation in the flexure of the spring means thus varying the contact pressure of the measuring members thereby decreasing the accuracy of the measurement. Especially, where an extremely high measuring accuracy is required, of the order of microns for example, the above described variation in the contact pressures greatly affects the accuracy of measuring the definite dimension of the workpiece.

Furthermore, in the conventional wide range dimension measuring apparatus, since there are provided independent guide members for slidably moving upper and lower measuring members, it is not only necessary to increase the number of such guide members and component parts thereof, but also the total error caused by the wear of the guide members and the manufacturing error increases to lower the measuring accuracy. Such large total error is not tolerable where extremely high accuracy of the order of microns is essential.

SUMMARY OF THE INVENTION

It is an object of this invention to provide an improved wide range dimension measuring apparatus which can always maintain a definite contact pressure between the measuring members and the workpiece to be measured irrespective of the dimension to be measured, thus enabling highly accurate measurement of varying dimensions.

Another object of this invention is to provide a new and improved wide range dimension measuring apparatus capable of greatly decreasing the number of the component parts of the guide members for upper and lower measuring members thus preventing lowering of the measuring effeciency caused by the wear of such component parts and manufacturing errors thereof.

Still another object of this invention is to provide a wide range dimension measuring apparatus which can assure a definite contact pressure between the measuring members and the workpiece embraced therebetween without using spring means.

According to this invention there is provided a wide range dimension measuring apparatus comprising a measuring head movable toward and away from an object to be measured, a movable block mounted on the measuring head to be movable relative thereto, a first measuring member secured to one side of the measuring block, a slidable member slidably received in the movable block, a second measuring member secured to the slidable member on the same side as the first measuring member so as to embrace the object between the first and second measuring members, a displacement detector to measure the relative displacement between the slidable member and the movable block for producing an electric signal, a first balancing weight means for supporting the force of gravity or weight acting on the movable block, and a second balancing weight means for supporting the force of gravity or weight acting on the slidable member.

BRIEF DESCRIPTION OF THE ACCOMPANYING DRAWINGS

In the accompanying drawings:

FIG. 1 shows a side elevation of a wide range dimension measuring apparatus embodying the invention;

FIG. 2 is a top plan view of the apparatus shown in FIG. 1 as viewed in the direction of arrow II;

FIG. 3 shows a section of the apparatus taken along a line III—III in FIG. 2;

FIG. 7 is an electric block diagram of a counter and a comparator for the output signal from a displacement detector.

DESCRIPTION OF THE PREFERRED EMBODIMENT

Figure 5:
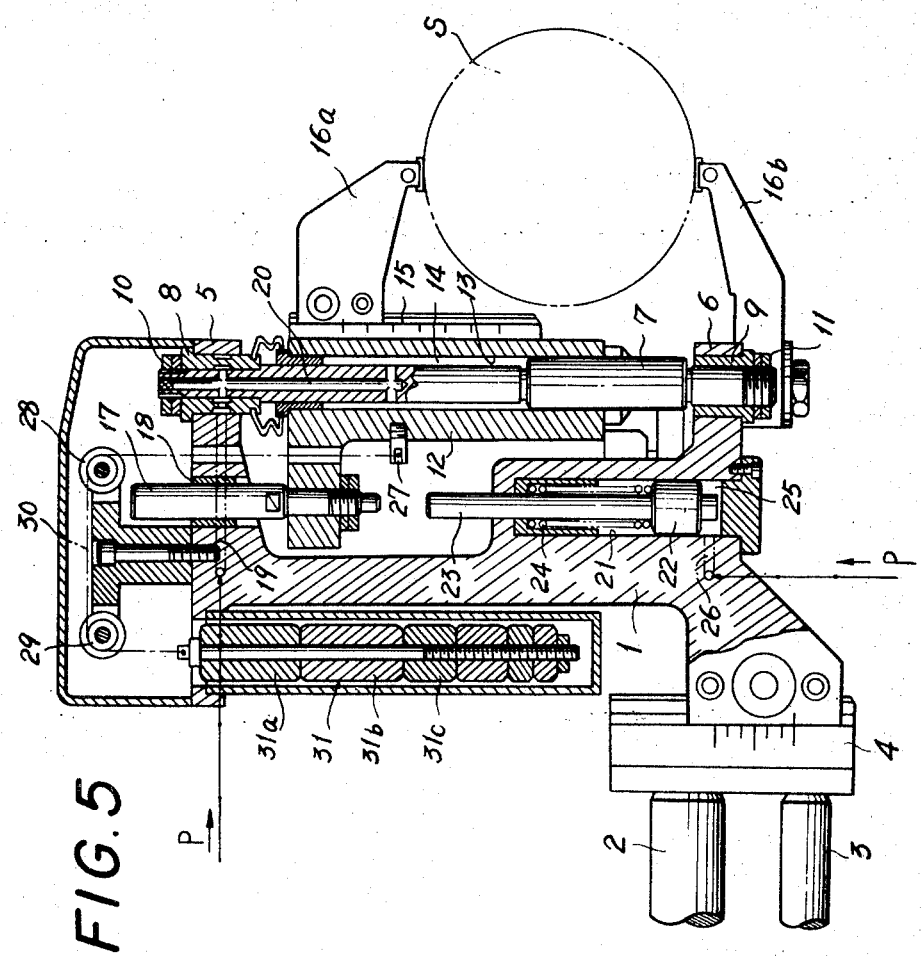
FIG. 5 shows a section taken along a line V—V in FIG. 2.

Referring now to FIGS. 1 to 4 of the accompanying drawing, the wide range demension measuring apparatus embodying the invention comprises a measuring head 1 which is adjustably mounted on a base 4 secured to one end each of a pilot bar 2 and a piston rod 3. The measuring head 1 is moved toward and away from a workpiece S to be measured along pilot bar 2 by means of an oil pressure cylinder (not shown) seccured to the left hand end of piston rod 3 as viewed in FIG. 1. As best shown in FIG. 5, the main body of the measuring head 1 has the longitudinal sectional configuration of a letter C having upper and lower jaws 5 and 6 to which are secured the upper and lower portions of a supporting rod 7 by means of bushings 8 and 9 and clmaping nuts 10 and 11 respectively. A movable block 12 is slidably mounted upon supporting rod 7 in a space between jaws 5 and 6 and a fluid pressure chamber 14 is defined between supporting rod 7 and the inner wall of a bore 13 extending through movably block 12. Upper measuring member 16a is adjustably mounted on a support 15 formed on one side of the movable block 12 to engage the workpiece S. A pilot bar 17 is secured to the upper end of movable block 12 to slidably extend through guide bushing 18 provided for the upper jaw 5 of the measuring head. The purpose of the pilot bar 17 is to guide the movement of movable block 12 relative to measuring head 1 and to prevent the movable block from rotating about supporting rod 7. As shown by an arrow P, compressed air is admitted into the fluid pressure chamber 14 via conduits 19 and 20 extending through the upper jaw of the measuring head and supporting rod 7, respectively so as to support a substantial percentage of the force of gravity or weight $B_1$ (see FIG. 6) acting on movable block 12 by a supporting force F provided by the compressed air. The measuring head 1 is formed with a cylinder 21 for receiving a piston 22 for operating the measuring member 16a. The upper end of the piston rod 23 of piston 22 is opposite to the lower end of pilot bar 17. A compression spring 24 is received in the upper portion of the operating piston 22 to urge downwardly piston 22. The compressed air is supplied to a fluid pressure chamber 25 at the bottom of cylinder 21 via a conduit 26 to raise piston 22 so as to raise movable block 12 through the engagement of piston rod 23 and pilot bar 17 thus moving the upper measuring member 16a away from the workpiece S. A pin 27 is secured to the inner side of movable block 12 and is connected to a balancing weight 31 through a flexible cable 30 passing about supporting pulleys 28 and 29. The balancing weight 31 comprises a plurality of weight elements 31a, 31b, 31c . . . of different weight so as to adjust the total weight. The weight $W_1$ of the balancing weight is adjusted to satisfy the following equation (see FIG. 6)

$$W_1 = (B_1 - f_1) - F$$

where $B_1$ represents the force of gravity or weight acting on movable block 12, $F$ the supporting force provided by the compressed air introduced into fluid pressure chamber 14 and $f_1$ the contact pressure inparted to the upper measuring member.

It is particularly pointed out that in this embodiment the contact pressure $f_1$ is not applied by spring means but instead by the adjustment of the weight $W_1$ of the balancing weight.

Figure 4:
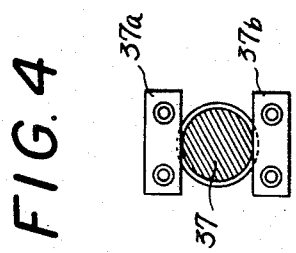
FIG. 4 shows a section of a portion of the apparatus taken along a line IV—IV in FIG. 3.

As shown in FIG. 3, movable block 12 is formed with a through hole 32 and guide bushings 33 and 34 are secured in the upper and lower ends, respectively, of the through hole 32 to receive a slidable rod 35. A lower measuring member 16b adapted to engage the lower side of workpiece S is secured to the lower end of slidable rod 35 whereas an arm 36 is connected to the upper end thereof. A depending pilot bar 37 is secured to arm 36 and is guided with a minimum sliding resistance by two guide plates 37a and 37b as best shown in FIG. 4. Again, the purpose of pilot bar 37 is to guide the movement of slide rod 35 relative to movable block 12 and to prevent slide rod 35 from rotating. It should be noted that, in this embodiment, the portions that guide the relative movement of the upper and lower measuring members 16a and 16b, the accuracy of said portions greatly affecting the measuring accuracy of the apparatus, are limited only to portions where slidable rod 35 fits in the movable block 12, that is guide bushings 33 and 34. A reference signal generator 38, in the form of a differential transformer for example, and axially adjustable by means of a rack-pinion mechanism 39 operable from outside is mounted on the movable block 12 to confront the lower end of pilot bar 37. Depending from substantially the mid point of supporting arm 36 is a standard scale 40 in the form of a magnetic grating scale, for example, which comprises one of the elements of a displacement detector, and a read head 41 in the form of a coil for detecting the magnetic grating is mounted on the movable block 12, said read head comprising the other element of the displacement detector. The standard scale 40 is protected by a bushing 40a. Further, the movable block 12 is formed with a cylinder 42 to receive a piston 43 for actuating the measuring member 16b, and an arm 45 is secured to the lower end of the piston rod 44 of the piston 43. A compression spring 46 is disposed beneath piston 43 to normally urge it upwardly. Upon admission of the compressed air into the fluid pressure chamber 47 above piston 43 as shown by arrow P, piston 43 is lowered to move downwardly the lower measuring member 16b away from workpiece S through arm 45. A pin 48 is threaded into the upper end of slidable rod 35 and is connected to another balancing weight 52 through a flexible cable 51 passing around supporting pulleys 49 and 50. Again, the balance weight 52 comprises a plurality of weight elements 52a, 52b, 52c . . . of different weight for adjusting the total weight to any desired value. The weight $W_2$ of the balancing weight 52 is adjusted to satisfy the following equation (see FIG. 6)

$$W_2 = B_2 + f_2$$

where $B_2$ represents the force of gravity or weight acting on slidable rod 35, and $f_2$ the contact pressure imparted to the lower measuring member 16b. It is also particularly to be noted that, in this embodiment the required contact pressure $f_2$ is applied to the lower measuring member 16b by the proper adjustment of the weight $W_2$ of balancing weight 52 and not by spring means as in the conventional measuring apparatus.

Figure 6:
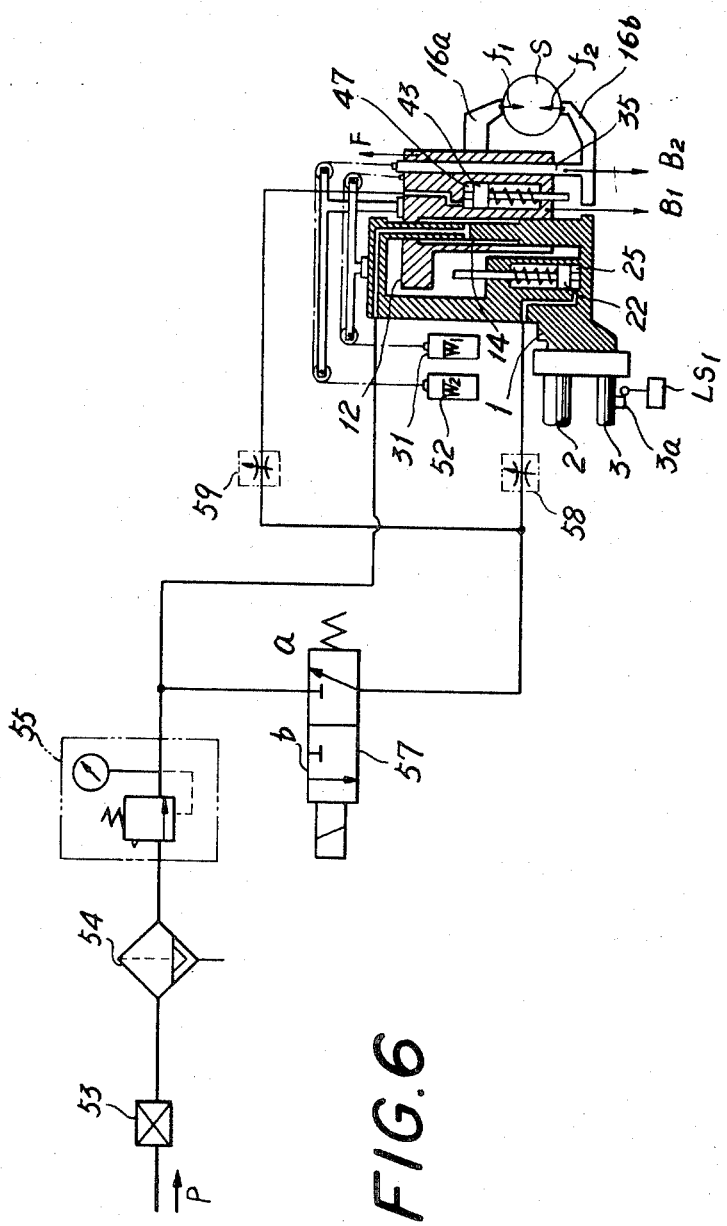
FIG. 6 shows a schematic sectional view together with a pneumatic system.

FIG. 6 shows a connection diagram for the compressed air. The compressed air supplied from a suitable source, not shown in the drawing, as shown by arrow P, is constantly admitted into fluid pressure chamber 14 through a stop valve 53, a filter 54 and a reducing valve 55 but admitted into fluid pressure chambers 25 and 47 through throttle valves 58 and 59, respectively, only when a transfer valve 57 is switched to a port b.

FIG. 7 shows a block diagram for counting and comparing the output signal from the displacement detector. More particularly, an electrical output from read head 41 representing the relative displacement between standard scale and read head 41 is passed through a polarity discriminator 60 and an encoder or pulse generating circuit 61 to produce a pulse signal in accordance with the direction of the displacement of the standard scale 40. The pulse signal is generated for each unit relative displacement of both detector elements 40 and 41 and is counted by an addition-subtraction counter 63 to determine the extent of the relative displacement. One input terminal of an AND gate circuit 62 is connected to the output of encoder 61 while the other input terminal to the output of the reference signal generator 38 through a NOT circuit 64. The output of the AnD gate circuit is couplPd with the addition-subtraction counter 63. Accordingly, when a reference signal is generated by the reference signal generator 38, the AND gate circuit is disenabled whereas upon termination of the reference signal it is enabled to supply the pulse generated by the encoder 61 to addition-subtraction counter 63.

At the beginning of the measuring operation, a master piece (not shown) is interposed between upper and lower measuring members 16a and 16b for setting a reference dimension. Under these conditions, the upper end of the reference signal generator 38 is brought to contact the lower end of pilot lever 37 by the manipulation of the rack-pinion mechanism 39 for producing a reference signal from the reference signal generator 38. Further, the counted value of the addition-subtraction counter is set to be equal to the dimension of the master piece so that the counter operates to subtract respective pulses from the set value for the displacement wherein the measuring members approach each other whereas to add respective pulses for the displacement wherein the measuring members are separated away, thus indicating the absolute value of the dimension between the upper and lower measuring members. The content of the addition-subtraction counter is compared with a value preset in a register 66 by a comparator 65, and when these two values coincide with each other a coincidence signal is generated by the comparator. The value preset in register 66 may be the finished dimension of the workpiece S and the comparator 65 digitally compares the coincidence and non-coincidence of the numerical data. The coincidence signal may be utilized as a command signal for controlling the feed of the grinding wheel carriage of a grinding machine, for example. For this reason, by the proper selection of the preset value in register 66 it is possible to generate a signal whenever the outer diameter of the workpiece S becomes equal to the set value. Such setting of the register can be made more simple than the conventional master setting and can be made automatically by using a commanding tape in digital control. Register 66 may be replaced by dial type presetting means.

The wide range dimension measuring apparatus thus far described operates as follows:

When a command signal for advancing the measuring apparatus is given, the transfer valve 57, FIG. 6, is switched to port $b$ to admit compressed air into fluid pressure chambers 25 and 47 via throttle valves 58 and 59 to separate the upper and lower measuring members 16a and 16b by the action of pistons 22 and 43. As above described the compressed air is normally introduced into fluid pressure chamber 14 so that the supporting force F provided by the compressed air supports a substantial percentage of the force of gravity or weight acting on movable block 12. Responsive to the advance command signal, pressurized oil is supplied to the aforementioned oil pressure cylinder (not shown) connected to the extension of piston rod 3 to advance the definite dimension measuring apparatus along pilot bar 2 toward workpiece S. At the forward end of the movement of measuring head 1, a dog 3a (see FIG. 6) secured to piston rod 3 actuates a limit switch LSI which confirms the forward end to switch the transfer valve 57 to port $a$ with the result that the compressed air in fluid pressure chambers 25 and 47 is exhausted to the atmosphere through throttle valves 58 and 59. Accordingly, the upper and lower measuring members 16a and 16b are moved toward each other at a relatively low speed to engage workpiece S. During this movement of the measuring members, pilot bar 37 disengages from the reference signal generating apparatus 38 due to upward movement of rod 35 and arm 36 (see FIG. 3) whereby the generation of the reference signal from the reference signal generating circuit 38 is terminated thus enabling AND gate circuit 62 to apply the pulse signal from encoder 61 to addition-subtraction counter 63. As above described, the required contact pressures $f_1$ and $f_2$ are applied to upper and lower measuring members 16a and 16b by the adjustment of balancing weights $W_1$ and $W_2$. Measuring members 16a and 16b are moved toward each other as the outer diameter of the workpiece S is decreased as the grinding operation proceeds, thus producing an electrical signal in read head 41 corresponding to the relative displacement between the pair of measuring members. The electric signal generated by the read head 41 is connected into a pulse by encoder 61 and the pulse signal is applied to addition-subtraction counter 63 through AND gate circuit 62. The number of pulses is subtracted from the initial set value of the counter 63 whereby the content thereof displays the absolute value of the dimension of the workpiece.

When the grinding operation proceeds until the finished dimension of the workpiece comes to coincide with the preset value of register 66, comparator 65 generates a coincidence signal which is used to retract the grinding wheel carriage and to switch the transfer valve 57 to port $b$. Accordingly, the compressed air is admitted into fluid pressure chamber 25 and 47 to move the upper and lower measuring members 16a and 16b away from the workpiece. After thus opening the measuring members the measuring head 1 is retracted by the action of piston rod 3 thus completing one cycle of the operation of the wide range dimension measuring apparatus.

As has been frequently pointed out hereinabove, since according to the invention required contact pressures $f_1$ and $f_2$ are applied to the upper and lower measuring members by the adjustment of balancing weights $W_1$ and $W_2$ and not by spring means as in the conventional design, the contact pressures are always maintained at the adjusted values and are never affected by the variation in the spring force. Thus, it is possible to measure the dimension at extremely high accuracy. Further adjustment of the balancing weights $W_1$ and $W_2$ gives adequate contact pressures.

Moreover, the guides for the relative movement of the upper and lower measuring members, said guides greatly influencing the accuracy of the measurement, are limited to the engaging portions between slidable rod 35 and guide bushings 33 and 34 alone thus greatly decreasing the number of component elements comprising guide means for a pair of relatively movable measuring elements. Thus, the cumulative action of the wear of such guide means and the manufacturing error thereof upon the measuring accuracy can be greatly reduced.

It is to be understood that the invention is by no means limited to the particular embodiment shown and described hereinabove, and that many changes and modifications may be made without departing from the true spirit and scope of the invention as defined in the appended claims. Thus, for example, instead of supporting the force of gravity $B_1$ acting upon movable block 12 by the force of the compressed air admitted into fluid pressure chamber 14 and the weight $W_1$ of balancing weight 31, the force of gravity $B_1$ can be supported by the balancing weight alone.

We claim:

1. Wide range dimension measuring apparatus comprising a measuring head movable toward and away from an object to be measured, a movable block mounted on said measuring head to be movable relative thereto, a first measuring member secured to one side of said movable block, a slidable member slidably received in said movable block, a second measuring member secured to said slidable member on the same side as said first measuring member so as to embrace said object between said first and second measuring members, a displacement detector to measure the relative displacement between said slidable member and said movable block for producing an electric signal, first balancing weight means for supporting the force of gravity acting upon said movable block, and second balancing weight means for supporting the force of gravity acting upon said slidable member.

2. The measuring apparatus according to claim 1 wherein said measuring head is in the form of a letter C with two jaws, said movable block is slidably mounted on a supporting rod supported between said jaws, and a fluid pressure chamber is defined between said movable block and said supporting rod to support said movable block relative to said supporting rod.

3. The measuring apparatus according to claim 1 wherein said first balancing weight is provided for said measuring head on the side thereof opposite said measuring members and is connected to said movable block by means of flexible cable means.

4. The measuring apparatus according to claim 1 wherein said first balancing weight means comprises a plurality of balancing weight elements of different weight.

5. The measuring apparatus according to claim 2 wherein the weight $W_1$ of said first balancing weight means is selected to satisfy a relation $$W_1 = (B_1 - f_1) - F$$

wherein $B_1$ represents the force of gravity acting on said movable block, $F$ the supporting force provided by the pressurized fluid introduced into said fluid pressure chamber and $f_1$ the contact pressure imparted to said first measuring member.

6. The measuring apparatus according to claim 1 wherein said movable block is formed with a through hole, said slidable member comprises a slidable rod being loosely received in said through hole, and said second measuring member is secured to the outer end of said slidable rod, said slidable rod being supported in said through hole by guide bushings on the opposite ends of said through hole.

7. The measuring apparatus according to claim 1 wherein said movable block formed with a cylinder and a piston is contained in said cylinder for actuating said second measuring member.

8. The measuring apparatus according to claim 6 wherein said slidable rod is connected to said second balancing weight means through flexible cable means.

9. The measuring apparatus according to claim 1 wherein said second balancing weight means comprises a plurality of balancing weight elements of different weight.

10. The measuring apparatus according to claim 6 wherein the weight $W_2$ of said second balancing weight means is selected to satisfy a relation $$W_2 = B_2 + f_2$$

where $B_2$ represents the gravity acting upon said slidable rod and $f_2$ the contact pressure imparted to said second measuring member.

11. The measuring apparatus according to claim 1 wherein a pilot bar is connected to said movable block and said pilot bar is slidably supported by said measuring head whereby to privent said movable block from rotating.

12. The measuring apparatus according to claim 11 wherein a fluid pressure cylinder is provided for said measuring head beneath said pilot bar and a piston is contained in said cylinder to engage said pilot bar for moving said movable block.

13. The measuring apparatus according to claim 6 wherein the upper end of said slidable rod is connected to a pilot bar through a connecting arm, said pilot bar being slidably received in said movable block for guiding the movement of said slidable bar with respect to said movable block, and a reference signal generator is adjustably mounted on said movable block to cooperate with said pilot bar.

14. The measuring apparatus according to claim 13 wherein said reference signal generator comprises a differential transformer.

15. The measuring apparatus according to claim 13 wherein said displacement detector comprises a pair of cooperating elements, one of said elements being connected to said connecting arm and the other supported by said movable block.

16. The measuring apparatus according to claim 15 wherein said one element of said displacement detector comprises a magnetic standard scale and the other element comprises an electric coil.

17. The measuring apparatus according to claim 2 wherein means is provided to constantly admit fluid under pressure into said fluid pressure chamber for operating said movable block.

18. The measuring apparatus according to claim 7 which further comprises a transfer valve for admitting and discharging fluid under pressure to and from said cylinder.

19. The measuring apparatus according to claim 12 wherein a transfer valve is provided for admitting and discharging of fluid under pressure to and from said fluid pressure cylinder.

* * * * *